United States Patent

Fritzius

[15] 3,638,058

[45] Jan. 25, 1972

[54] ION WIND GENERATOR

[72] Inventor: Robert S. Fritzius, 3328 Cowley Way, #2, San Diego, Calif. 92117

[22] Filed: June 8, 1970

[21] Appl. No.: 44,207

[52] U.S. Cl. ................................. 313/63, 317/4, 315/111
[51] Int. Cl. ............................... H05h, H05b, H01j 7/24
[58] Field of Search ........... 313/63, 174; 315/111; 417/48, 417/49; 317/4, 2

[56] References Cited

UNITED STATES PATENTS 3,116,433  12/1963  Moncrieff-Yeates ................. 315/111
3,071,705   1/1963  Coleman et al. ..................... 315/111

*Primary Examiner*—Ronald L. Wibert
*Assistant Examiner*—Conrad Clark
*Attorney*—Richard K. Macneill

[57] ABSTRACT

An ion wind generator in which a plurality of cathodes is disposed in operable proximity to a plurality of anodes forming an array with a high-voltage electric field on the order of 10 kilovolts per centimeter impressed between them causing the formation of ions which, in turn, are attracted by the anodes creating an ionic wind in the direction from the cathodes to the anodes, the adjacent anodes and cathodes being impressed with opposite polarity fields for neutralizing the ionic content of the combined windstreams.

5 Claims, 6 Drawing Figures

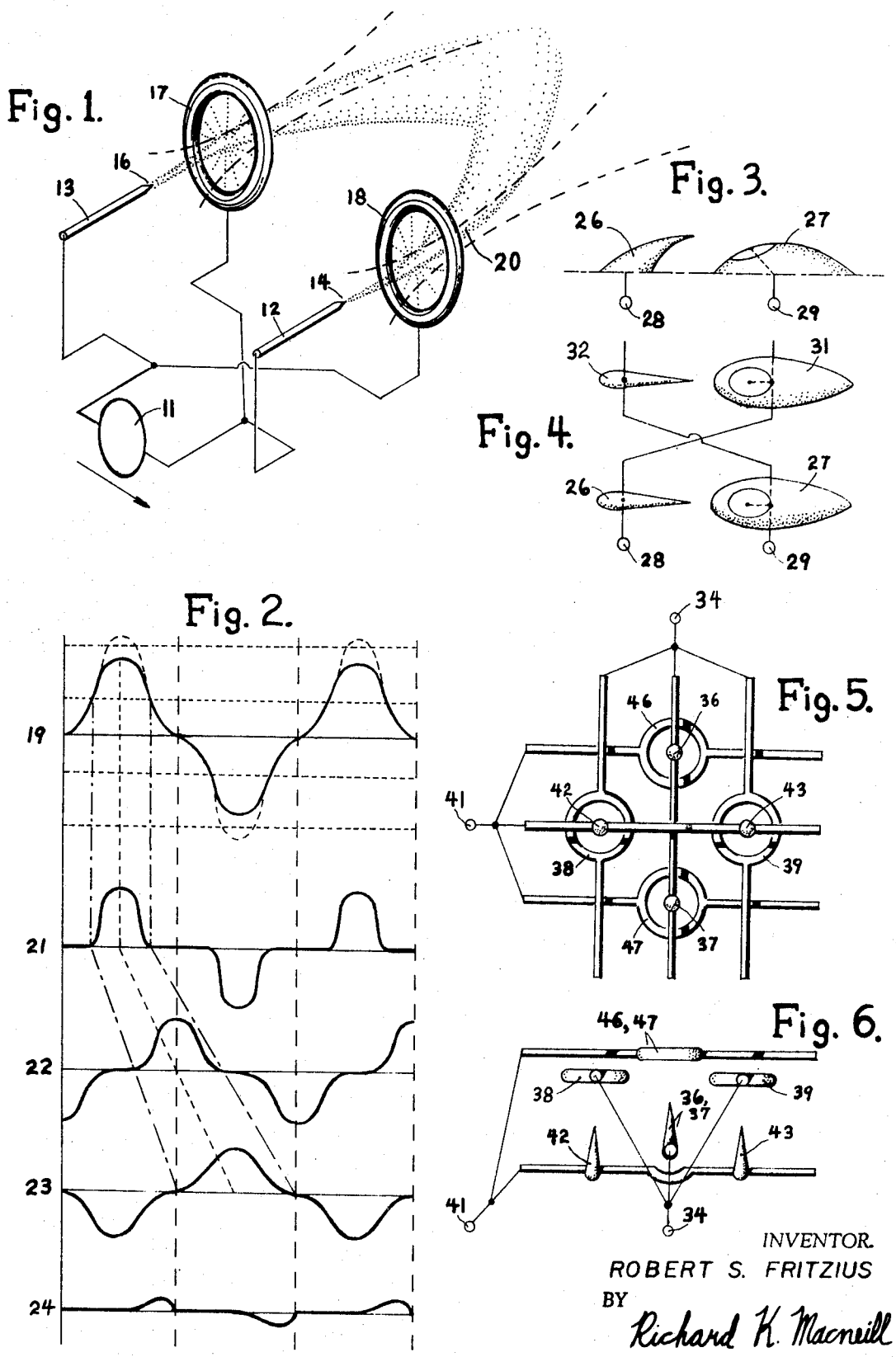

3,638,058

ION WIND GENERATOR

BRIEF DESCRIPTION OF THE INVENTION

The present invention relates to an ion wind generator and more particularly to an ion wind generator utilizing the formation and flow of ions to create wind.

According to the invention, an ion wind generator is provided having a plurality of sharp pointed cathodes in operable proximity to a plurality of smooth surfaced anodes. An electric field in the order of 10 kilovolts per centimeter is impressed between the cathodes and the anodes resulting in a corona discharge region in the immediate proximity of the cathodes. This, in turn, will create ionization of air molecules; i.e., charged particles of the same polarity as the cathode in that region creating wind streams toward the anodes. One electrode arrangement which has been found empirically to result in a heavy flow of wind is a simple needlepoint as the cathode pointing at the center of a metallic ring utilized as the anode. The wind then is concentrated in the center of the metallic ring which can be considered a focusing anode. The high voltage with several of these in an array would be alternated between adjacent electrodes. The voltages impressed are preferably alternating pulses, the advantages of which will be explained below.

An object of the present invention is the provision of an ion wind generator for generating a wind of neutralized particles.

Another object of the invention is the provision of an ion wind generator which is extremely efficient and inexpensive.

A further object of the invention is the provision of an ion wind generator utilizing a minimum of anode current thereby reducing electrolysis effects.

Other objects and many of the attendant advantages of this invention will be readily appreciated as the same becomes better understood by reference to the following detailed description when considered in connection with the accompanying drawings in which like reference numerals designate like parts throughout the FIGS. thereof and wherein:

FIG. 1 is a schematic diagram of one embodiment of the present invention;

FIG. 2 illustrates various voltages and current waveforms;

FIGS. 3 and 4 illustrate another embodiment of the present invention; and

FIGS. 5 and 6 illustrate still another embodiment of the present invention.

DETAILED DESCRIPTION OF THE DRAWINGS

Referring to FIG. 1, voltage generator 11 is coupled between cathodes 12 and 13 having points 14 and 16, respectively. Cathode 12 is coupled to anode 17 and cathode 13 is coupled to anode 18.

Referring to FIG. 2, waveforms 19, 21, 22, 23 and 24 are illustrated.

Referring to FIG. 3, cathode 26 is shown in spatial relationship with anode 27 with terminals 28 and 29, respectively, attached thereto.

Referring to FIG. 4, terminal 28 is coupled to cathode cathode 26 and anode 31 and terminal 29 is coupled to anode 27 and cathode 32.

Referring to FIGS. 5 and 6, terminal 34 is coupled to cathodes 36 and 37 and to anodes 38 and 39. Terminal 41 is coupled to cathodes 42 and 43 and to anodes 46 and 47.

OPERATION

Referring back to FIG. 1, it can be seen that with a high DC voltage impressed between cathode point 12 and ring anode 18, an electrostatic field will result causing a corona discharge region surrounding point 14. This corona discharge region will ionize the air molecules in proximity to point 14 which, being charged particles of the same polarity as the cathode, will, in turn, be attracted toward ring anode 18 which will also act as a focusing anode. The accelerated ions will impart kinetic energy to neutral air molecules by repeated collisions and attachment. Neutral air molecules thus accelerated, constitute the useful mechanical output of the ion wind generator. The majority of ions, however, will end their usefulness upon reaching the ring 18 where they fan out radially and collide with the ring producing anode current. A small portion of the ions will possess sufficient kinetic energy to continue on through the ring along with the neutral particles. These result in a slight loss of efficiency because they tend to be drawn back to the anode. The same theory will apply for cathode 13 and anode 17. Since opposite polarities are impressed on each cathode-anode pair, their exiting airstreams will contain oppositely charged ions which will merge and neutralize; i.e., being of opposite plarity, the ions will attract each other and be neutralized by recombination.

Referring to FIG. 2, a series of waveforms is shown which will now be described. Waveforms 21, 22, 23 and 24 approximate the cathode 12, anode center, downstream space charge 20, and anode 18 currents, respectively, which result when generator 11 produces voltage waveform 19. The flattening of waveform 19 is caused by current loading; i.e., it occurs during the corona period and prevents the gap voltage from reaching the arc potential indicated as the highest and lowest dotted lines. The corona period and levels are indicated by dotted lines between which current flows in waveform 21 and the central horizontal dotted lines in waveform 19. The frequency of waveform 19 is adjusted so that its period equals four times the average cathode-anode transit period for ions.

It can be seen that when the cathode-anode voltage is passing through zero, the anode 18 will no longer attract ions passing through it. Therefore, waveforms 22 and 24 represent the space charge current passing through the anode region and the anode current, respectively. Waveform 23 represents the downstream space charge current. Since the voltage source has reversed polarity at the time that downwind space charge current is at peak value, the anode becomes the same polarity as the downstream space charge and gives the ions an added acceleration. The downstream pulses of space charge current from each set of electrodes are of opposite polarity and, therefore, will merge and neutralize one another completing the current loop external of the anodes.

Utilizing a simple array, as shown in FIG. 1, an array is shown in FIGS. 3 and 4 which contemplates further additions thereto in two dimensions thereby enabling the creating of a sheet of wind. Here, cathodes 26 and 32 have a different geometry as do anodes 27 and 31 which are simply smooth surfaces in operable proximity to the points of cathodes 26 and 32. This will result in increased aerodynamic efficiency due to drag reduction by streamlining i.e., the ionic wind would be tangential to the surface of anodes 27 and 31. Here, again, the polarity between adjacent cathodes and anodes is opposite resulting a neutralization of the downstream ionic content. The voltages, of course, are applied at terminals 28 and 29. The same voltage may be used downstream for cascading a plurality of arrays.

Referring to FIGS 5 and 6, a further refinement is contemplated showing a grid arrangement with one voltage terminal being applied at 34 and another at 41. The grid layout results in a closer knit plurality of ion generators which, in turn, results in a more efficient wind generator for ducting purposes; i.e., by stacking a plurality of the grids.

It should be understood, of course, that the foregoing disclosure relates to only a preferred embodiment of the invention and that it is intended to cover all changes and modifications of the example of the invention herein chosen for the purposes of the disclosure which do not constitute departures from the spirit and scope of the invention.

The invention claimed is:
1. An ionic wind generator comprising:
 a plurality of cathodes;
 a plurality of anodes disposed in operable proximity to said plurality of cathodes; and
 a high voltage of an amplitude for causing corona discharge having output terminals of opposite polarity, said high voltage terminals coupled between said anodes and cathodes in which adjacent anodes have opposite polarities and adjacent cathodes have opposite polarities for neutralizing the ionic content of resulting combined windstreams.
2. The ionic wind generator of claim 1 wherein:
said anodes have a substantially circular ring configuration.
3. The ionic wind generator of claim 1 wherein:
said anodes comprise smoothly curved surfaces for creating a tangential wind.
4. The ionic wind generator of claim 1 wherein:
said high voltage is alternating.
5. The ionic wind generator of claim 4 wherein:
said alternating high voltage comprises alternating pulses.

* * * * *